March 17, 1970     R. H. READ     3,500,817
LIQUID HEATING DEVICE

Filed March 25, 1968     2 Sheets-Sheet 1

INVENTOR
RICHARD H. READ
BY:
ATTORNEY

March 17, 1970  R. H. READ  3,500,817
LIQUID HEATING DEVICE

Filed March 25, 1968  2 Sheets-Sheet 2

INVENTOR
RICHARD H. READ
BY:
ATTORNEY

United States Patent Office 3,500,817
Patented Mar. 17, 1970

3,500,817
LIQUID HEATING DEVICE
Richard H. Read, San Diego, Calif., assignor to Hydronics Systems, Inc., San Diego, Calif., a corporation of California
Filed Mar. 25, 1968, Ser. No. 715,612
Int. Cl. F24h 1/10
U.S. Cl. 126—350                                    10 Claims

ABSTRACT OF THE DISCLOSURE

A heater for the heating of liquids is disclosed which has dual heat exchange chambers, one surrounded by the other. The inner heat exchange chamber has a flame producing means disposed in it which heats the liquid introduced into the chamber as well as the side wall of the heat exchange chamber, causing the inner heat exchange chamber to act as a bi-wall heat exchanger. Hot combustion gases generated by the flame producing means provide the heating means in the outer heat exchange chamber, together with the bi-wall effect.

---

The present invention relates generally to an improved liquid heating device, and more specifically, to a heater capable of causing a rapid and substantial increase in the temperature of a continuously flowing liquid as well as being able to maintain a large volume of liquid at an elevated temperature.

Liquid heating devices in the past have varied in principle and construction, however, the most efficient principle calls for the direct heating of the liquid by a flame producing means. The prior art has shown liquid heating devices which directly heat a liquid with a flame in one heat exchange chamber and then use the hot combustion products as a source of heat to raise the temperature of additional liquid in a second completely independent heat exchange chamber. These devices generally comprise side-by-side heat exchange chambers with a flame producing means disposed in the top of one of the heat exchange chambers and air exhaust means disposed in the upper portion of the other heat exchange chamber. Mechanical air exhaust means are required in these devices to draw the hot combustion products from one heat exchange chamber and into and up through the other heat exchange camber. These units are not as compact as possible, nor do they use the overall sources of heat to maximum efficiency. Further, while these devices operate satisfactorily for short periods of time, after relatively short-term operation the air exhaust means is rendered inoperative as a result of liming and the continued exposure to the corrosive elements produced by the combustion and heating process, thereby making continued maintenance and replacement necessary. Further, the arrangements utilized by these devices are such as to make maintenance and parts replacement a time-consuming operation.

It is an object of this invention to provide an improved high efficiency liquid heating device.

Another object is to provide a heating device which is compact in construction and utilizes the sources of heat to their maximum.

Another object is to provide a high efficiency heating apparatus which is economical and trouble free in operation.

Another object is to provide a heating apparatus arranged so as to facilitate serviceability.

Another object is to provide a burner capable of operating effectively in a vertical down position.

Still another object is to provide a burner ignition system which includes a vertical downdraft pilot.

An additional object is to provide a pressurized burner simple in construction and efficient in operation.

These and other objects of the invention are more particularly set forth in the following detailed description and in the accompanying drawings of which:

The liquid heating device may be used to cause an increase in the temperature of any nonflammable liquid. A liquid is considered to be nonflammable for purposes of this invention if it is not subject to instantaneous combustion when placed in direct contact with the open flame of the burner contained in the heating device.

Figure 1:
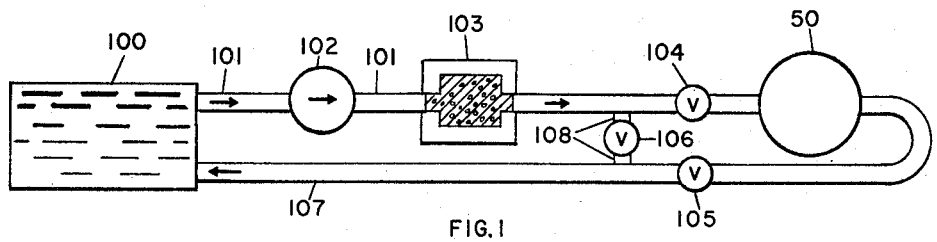
FIGURE 1 is a schematic flow diagram which depicts the liquid heating device as used in a system which requires that a large volume of liquid be maintained at an elevated temperature.
Figure 2:
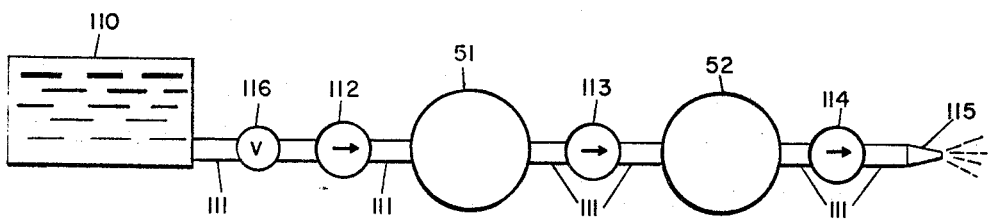
FIGURE 2 is a schematic flow diagram which depicts the liquid heating device as used in series connections for high temperature operations.

FIGURES 1 and 2 generally depict two different applications for which the liquid heating device can be used. One application calls for the capability of maintaining the temperature of a large volume of liquid at a moderately elevated temperature, as in the case of water in a swimming pool. The other application requires a device capable of heating a continuously flowing liquid to a relatively high temperature, for example, for use in a car washing or laundromat facility.

FIGURE 1 presents a system designed to maintain a large volume of liquid at an elevted temperature. A continuous flow of liquid is provided from liquid containing tank 100 to filter 103 designed to remove foreign particulate matter from the system and liquid heating device 50 by means of pump 102 and connecting lines 101. Liquid heating device 50 is provided with a self-pumping outlet or ejector means (described in detail later in these specifications) which causes the liquid entering the liquid heating device 50 to be withdrawn continuously from it and returned to tank 100 through return line 107.

A suitable thermostatic control, not shown, which is activated by the temperature of the liquid in tank 100, is provided. The control activates the liquid heating device by causing the flame producing means to ignite when the control senses a liquid temperature which corresponds to a preset low temperature set point. When the control senses a liquid temperature which corresponds to a preset high temperature set point, the control deactivates the liquid heating device by causing the flame producing means to stop operating.

Dring long-term liquid heating device inactivity it may be desirable to stop the continuous flow of liquid through it; bypass means comprising valves 104, 105 and 106 and lines 108 are therefore provided. Normally valve 106 is closed and valves 104 and 105 are open, thereby allowing liquid flow through liquid heating device 50; when such flow is not desired, valves 104 and 105 are closed and valve 106 is opened, which terminates the flow through the liquid heating device 50 and allows it to continue through bypass lines 108 and valve 106 and into tank 100.

FIGURE 2 presents a system designed to provide a continuous flow of relatively high temperature liquid. In FIGURE 2 the liquid to be heated is contained in tank 110. Pump 112 causes liquid to flow into a first liquid heating device 51 through connecting lines 111.

Pump 113 withdraws the heated liquid from liquid heating device 51 and causes it to flow into a second liquid heating device 52 through connecting lines 111. Liquid heating devices 51 and 52 may be identical to the liquid heating device 50, previously mentioned. Pump 114 finally removes the high temperature liquid from liquid heating device 52 and forces it through nozzle 115. Additional liquid heating devices can be serially connected to provide even higher final liquid temperatures. Valve 116 provided in the system is open during heating operations and may be closed to alleviate liquid head pressure on the pump 112 when the system is not operating.

Figures 3, 4:
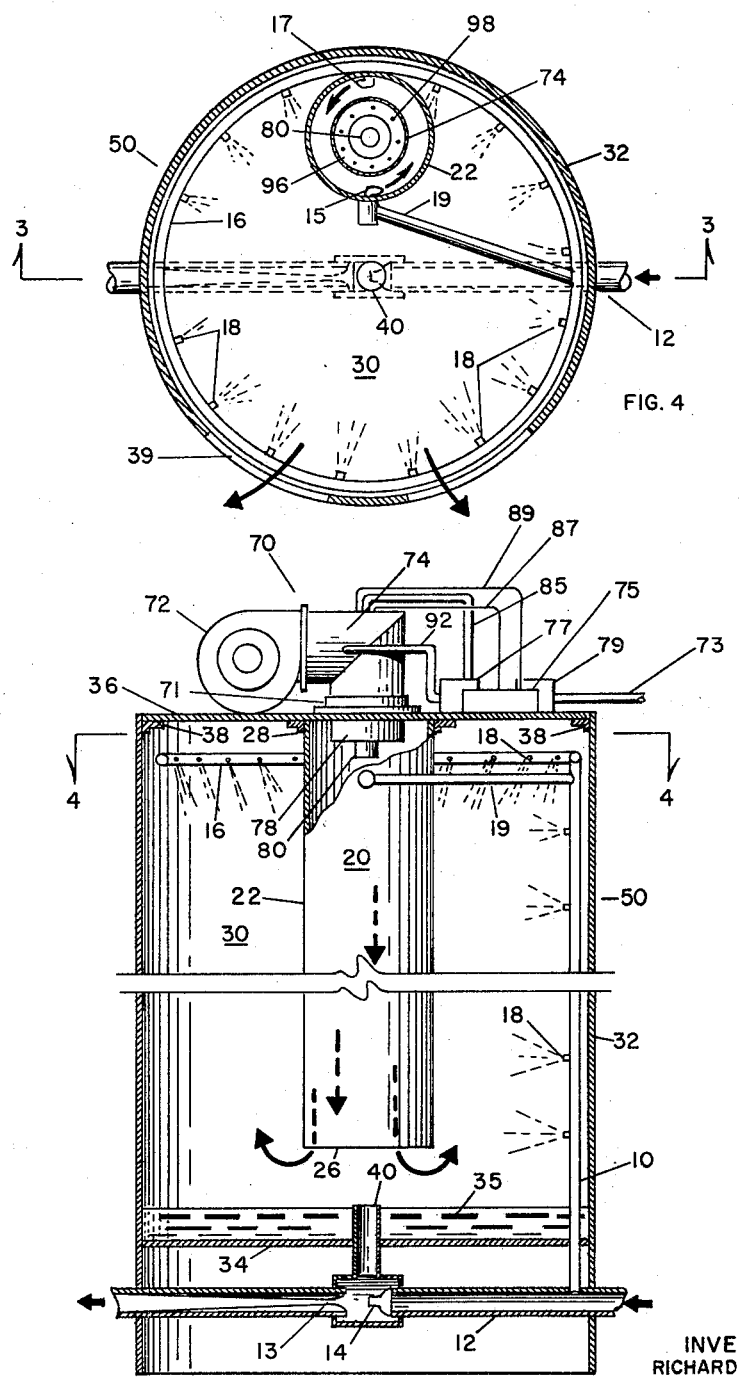
FIGURE 3 is a sectional view of the liquid heating device taken along line 3—3 of FIGURE 4.
FIGURE 4 is a cross-sectional view of the liquid heating device shown in FIGURE 3 taken along line 4—4.

The liquid heating device 50, shown in FIGURES 3 and 4, generally comprises a vertically extending outer heat exchange chamber 30 which surrounds a vertically extending inner heat exchange chamber 20. The chambers are connected by passage means, such as an opening 26 provided in the lower portion of the inner chamber. Liquid is supplied to and is heated in both chambers simultaneously during operation. The cross-sectional geometry of the chambers is not critical; however, the preferred arrangement utilizes a tubular construction having a circular or oval cross-section.

The liquid enters the inner heat exchange chamber 20 through an inlet means located adjacent to its upper end. The inlet means can be any appropriate means which causes the liquid to flow downwardly on the inner surface of inner heat exchange chamber wall 22, also referred to as tube 22 hereinafter. The preferred arrangement would utilize means which direct the entering liquid circumferentially along the inner surface of the inner heat exchange chamber, causing the liquid to flow in a spiral-like path down the inner surface of the inner heat exchange chamber wall, thereby coating the surface with a film of liquid.

The liquid enters the outer heat exchange chamber 30 through inlet means provided therein. The inlet means can be any suitable means which causes a dispersion of the liquid entering the chamber. The preferred arrangement utilizes inlet means comprising spray nozzles 18 spaced throughout the chamber. The utilization of a circular header 16 adjacent to the upper end and inner surface of the outer heat exchange chamber provided with generally downwardly directed spray nozzles 18 spaced around the header has been found to provide excellent liquid dispersion in the second heat exchange chamber.

The primary source of heat to the continuously supplied liquid in the inner heat exchange chamber 20 emanates from a downwardly directed flame producing means 70 adjacent the upper end of the inner heat exchange chamber. The flame producing means 70 provides an open flame which burns downwardly and extends a substantial distance down the inner heat exchange chamber. The hot combustion gases which are created by the flame producing means 70 flow downwardly within the inner heat exchange chamber, through the opening 26 at the lower end of the inner heat exchange chamber 20, and upwardly in the outer heat exchange chamber 30. These hot gases act as a secondary source of heat to the liquid in the inner heat exchange chamber 20. The sources of heat in the inner chamber 20 not only cause an increase in the temperature of the liquid in the inner chamber, but also increase the temperature of the wall 22 of the inner chamber. The wall 22 of the inner chamber 20 acts as a source of heat in the outer heat exchange chamber 30 in addition to the hot gases which flow through the outer chamber 30. The flow of gas along the general path described above can be achieved by using a suitable mechanical draft or exhaust inducing means appropriately located in the outer chamber; however, the preferred arrangement does not utilize such draft or exhaust inducing means. Preferably a pressurized flame producing means is utilized which creates a pressure differential between the inner and outer chambers and the outside atmosphere which results in a natural flow of hot gases in this general path.

The heated liquid from both the inner and outer chamber collects in the lower end of the outer chamber and is withdrawn by any suitable pumping means.

One form of the improved liquid heating device is shown in FIGURES 3 and 4. The device shown is particularly suited to the application depicted in FIGURE 1 in that it is provided with a self-pumping means and is designed to produce a moderate temperature differential between the inlet and outlet liquid. The liquid heating device 50 generally comprises an inner heat exchange chamber 20 and an outer heat exchange chamber 30, which are formed by a vertically extending circular tube 22 disposed within another vertically extending circular tube 32. The tubes are preferably constructed of a corrosion-resistant material, such as stainless steel. A circular base plate 34 suitably affixed to the lower end of the tube 32 and provided with openings to accommodate a distributor inlet line 10 and an outlet line 40, together with the lower portion of the tube 32, form a sump wherein the heated liquid collects prior to withdrawal from the liquid heating device. The inner heat exchange chamber tube 22 is fixed in place by side brackets, not shown, attached to it which are suitably connected to the outer heat exchange chamber tube 32. A circular cover plate 36, which rests on the upper edge of the inner heat exchange chamber wall, and upper brackets 38 suitably affixed to the upper part of the outer heat exchange chamber wall 32, generally form the tops of the inner and outer heat exchange chamber. A circular bracket 28 affixed to the bottom of the cover plate 36 for positioning around the inner heat exchange chamber tube 22 provides lateral support and additional sealing for the upper end of the inner heat exchange chamber tube 22. The cover plate 36 is provided with an opening which accommodates a part of a flame producing means 70.

Liquid is supplied to the liquid heating device 50 from a main liquid supply line 12 through vertically extending distributor inlet line 10 adjacent the inner surface of the outer heat exchange chamber. A restriction 14 in the main liquid supply line 12 causes the liquid to flow continuously through distributor inlet line 10. Restriction 14 is a nozzle having a cross-sectional area less than the cross-sectional area of the distributor inlet line 10. By allowing distributor inlet line 10 to pass within the outer heat exchange chamber 30, a preheating of the liquid is effected. The distributor inlet line 10 connects with the horizontally positioned circular header 16 adjacent to the top of the outer heat exchange chamber 30 and adjacent the inner surface of the outer heat exchange chamber tube 32. Both the distributor inlet line 10 and circular header 16 are provided with spray nozzles 18 which disperse the liquid as it enters the outer heat exchange chamber.

A horizontal feed line 19 connects the distribution inlet line 10 to a nozzle 15. A second nozzle 17 connects directly to the circular header 16. Nozzles 15 and 17 penetrate the inner heat exchange chamber 20 adjacent its upper end. The nozzles 15 and 17 are aimed to provide flow in the same generally horizontal direction and are further positioned generally tangent the inner surface of the inner heat exchange chamber tube 22. The nozzles 15 and 17 cause the liquid entering to have a circumferential impetus and thereby form a liquid film which coats the inner surface of the inner chamber tube and further, maximizes the liquid flow path and in turn its residence time in the inner chamber.

Figure 5:
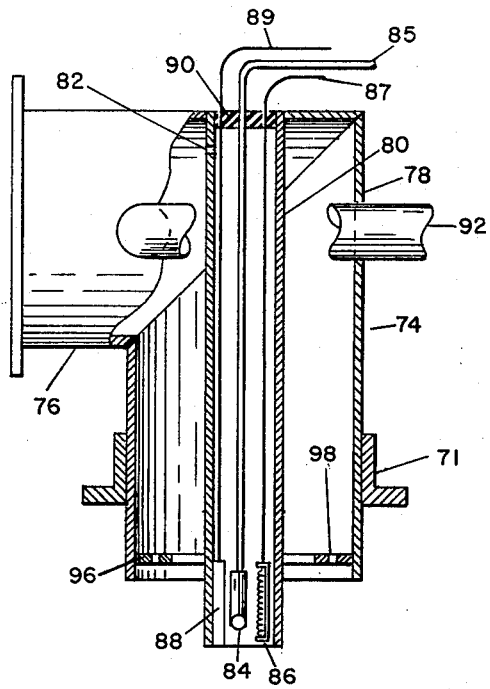
FIGURE 5 is an enlarged and detailed sectional view of the improved burner used in the liquid heating device.

The flame producing means 70 is generally disposed in the inner heat exchange chamber adjacent its upper end and comprises an air supply means, shown as a blower 72, a gas supply and regulating means 79 and 77, appropriate control and safety circuit means 75, and a burner 74. The burner 74, shown in detail in FIGURE 5, is generally formed by a horizontally extending burner tube 76, one end of which forms a 45° angle with its center line, and a vertically extending burner tube 78, of equal diameter and wall thickness, one end of which also forms a 45° angle with its center line, which are suitably connected at their 45° angle ends so as to form an L-shape. The other ends of both burner tubes form 90° angles with the respective tube center lines. The 90° end of the horizontal burner tube 76 is connected to the air blower 72 mounted on top of cover plate 36. The 90° end of the vertical burner tube 78 extends through the opening provided in cover plate 36 into the top of inner heat exchange chamber 20. A circular bracket 71, which sits on cover plate 36, and is affixed to the vertical burner tube 78, supports the burner. The diameter of the opening in cover plate 36 should correspond closely to the outside diameter of the vertical burner tube 78. A pilot tube 80 is vertically disposed in a concentric manner in the vertical burner tube 78. The upper end of pilot tube 80 is suitably bonded to the horizontal burner tube 76, and the lower end extends slightly below the lower end of the vertical burner tube 78. An opening 82 is provided at the upper end of the pilot tube 80 and above the center line of the horizontal burner tube and facing the air blower 72. A pilot 84, a glow coil 86 and a thermocouple 88 are generally disposed in the lower end of pilot tube 80. A pilot gas feed line 85 connected to pilot 84, a glow coil current supply line 87 connected to the glow coil 86 and a thermocouple line 89 connected to the thermocouple 88, extend vertically inside pilot tube 80 and pass through openings provided in seal plug 90 located in the upper end of the pilot tube 80. Pilot gas feed line 85 connects to gas supply means 79, and glow coil current supply line 87 and thermocouple line 89 connect to the control and safety circuit means 75. A primary gas supply line 92 penetrates the horizontal burner tube 76 perpendicular to and generally at the horizontal burner tube center line and at a point in the vicinity of the vertical burner tube 78. The penetration is suitably sealed to prevent leakage around the primary gas supply line 92. The primary gas supply line 92 is provided with a gas supply orifice, not shown, aimed in a direction generally downward and away from the air blower 72 and, therefore, generally away from the opening 82 in the pilot tube 80. Diffuser 96, provided with circumferentially spaced openings 98, is horizontally positioned exterior pilot tube 80 and interior vertical burner tube 78 generally adjacent its lower end.

Activation of the flame producing means begins with the supplying of current to the air blower 72 causing air to flow through the vertical burner tube 78, the supplying of current to the glow coil 86 causing it to glow, and the opening of a pilot gas valve 79, causing gas to be supplied to the pilot 84 through the pilot gas feed line 85. The glowing glow coil 86 ignites the pilot 84. Thermocouple 88 monitors the pilot temperature and provides a signal to the control means 75 which opens the primary gas supply line valve 77, allowing gas to enter the primary gas supply line 92 when the pilot temperature reaches a predetermined value. The primary gas enters the burner through the gas supply orifice, not shown, and mixes with air flowing through the burner; the mixture then flows downward through the horizontal burner tube and is ignited by the burning pilot. The combustion process creates gases which expand in volume due to their being heated. The mass flow of the gas/air mixture is such as to overcome the back pressure created by the expanding gases. The pressure in the upper part of the inner heat exchange chamber will increase until a sufficient pressure differential exists between the inner chamber and the outer chamber, which then will result in a flow of the hot gases from the inner to the outer heat exchange chamber. Therefore, the air blower 72, together with effective sealing of the various penetrations into the burner, cause it to function as a pressurized system. The resulting flame burns a substantial distance down the center of the inner heat exchange chamber 20. The pilot tube opening 82 is provided to continuously supply relatively pure air to the burning pilot and is essential for continued operation of a vertical downdraft pilot. Use of diffuser 96, while not essential, is preferred for high efficiency burner operation. The diffuser 96 acts as a flow restricting means which enables the gas to burn smoothly at the diffuser discharge. While the diffuser 96 is shown as a flat washer-shaped device, it may also take the shape of a frustum.

As an alternate to the glow coil pilot ignition means a suitable electro spark ignition means may be used.

The flame and combustion gases heat the liquid present in the inner heat exchange chamber 20 and further heat the wall of the inner heat exchange chamber. The combustion gases flow generally downward the inner heat exchange chamber 20, pass from the inner heat exchange chamber into the outer heat exchange chamber 30 through opening 26 in the lower part of the inner heat exchange chamber wall, flow generally upward in the outer heat exchange chamber and flow out of the liquid heater device through vents 39 provided in the upper part of the outer heat exchange chamber wall. The combustion gases flowing upwardly in the outer heat exchange chamber, together with the outer surface of the inner heat exchange chamber wall provide the source of heat for increasing the temperature of the liquid being dispersed in the outer heat exchange chamber. The inner heat exchange chamber acts as a "bi-wall" heat exchanger in that it not only provides heat internal its walls but also the outer surface of its vertical wall provides a source of heat to liquid exterior to it.

The hot combustion gases flow in the path described above as a result of the pressure differential between the pressurized burner, the outer heat exchange chamber and the atmosphere exterior the liquid heating device. Placing the vents in the outer heat exchange permits cover plate 36 to act as a partial gas deflector, thereby creating turbulent flow of the combustion gases which in turn increase the length of their flow path in the outer heat exchange chamber, resulting in more efficient heat transfer between the combustion gases and the liquid. Since the cover plate 36 is not affixed to brackets 38 and the upper end of the inner heat exchange chamber wall, it can act as an emergency pressure relieving means in the event that the vents 39 are not of sufficient size to accommodate an unexpected surge of pressure inside the liquid heating device. Further, the various controls and regulating devices noted hereinbefore are mounted on the cover plate 36 as well as the air blower and burner, thereby providing easy access to these components in the event that maintenance or replacement operations are required. This unique arrangement further enables the control and regulating system and flame producing means to be removed and replaced as a single unit.

Heated liquid 35 from both the inner and outer heat exchange chambers accumulate in the sump formed by base plate 34 and the outer heat exchange chamber tube 32. The heated liquid 35 is withdrawn from the sump through the liquid outlet line 40 into the main liquid supply line 12, as a result of a jet pump action. Nozzle 14 which causes the liquid to enter the liquid heating device also provides a jet-like flow into the subsequent portion of the main liquid supply line 12. This jet of liquid, together with a venturi 13 located adjacent the point where the water outlet line connects to the main liquid supply line, results in a suctioning effect, causing the heated liquid in the sump to be pumped down the main liquid supply line to some subsequent location. The venturi 13 causes expansion of the liquid, which in essence creates an aft-located vacuum effect. The relative dimensions of nozzle 14, venturi 13 and outlet line 40 may be determined using standard ejector principles.

It has been found that an even higher efficiency liquid heating device may be obtained by proper use of a baffle system in the outer heat exchange chamber 30. The baffle system spans the entire outer heat exchange chamber and takes the form of a highly porous structure. The preferred arrangement utilizes a honeycomb structure constructed of a good heat conducting material. The honeycomb baffle is located generally adjacent the lower end of the inner heat exchange chamber tube 22 in a generally horizontal plane, and is held in place by suitable brackets. The baffle further spans the outer heat exchange chamber 30 in such a manner as to minimize the gap between the outer edge of the baffle and the inner surface of outer heat exchange chamber tube 32, the gap between the inner edge of the baffle and the outer surface of the inner heat exchange chamber tube 22 and the gap surrounding the water inlet distributor line 10. Although it has not been precisely determined what phenomenon causes the additional increase in the efficiency of the liquid heating device 50 due to the use of the baffle system, a primary factor is thought to be, but is in no way intended to limit the scope of the invention, the liquid film surface created on the honeycomb by capillary attraction.

To protect the components located on cover plate 36 and to provide aesthetic appeal to the overall liquid heating device, a cover or lid may be provided which may take any suitable form, i.e., a dome, a cone, a cylinder, frustum, etc.

When the liquid heating device described specifically above is utilized to heat water flowing at a rate of about 28 gallons a minute in the main liquid supply line 12, and the dimension of the distributor inlet line 10 and nozzle 14 are such as to cause water to flow through the liquid heating device 50 at a rate of about 65 gallons a minute, a temperature rise of on the order of about 19° F. is observed in the main supply line of venture 13 when the inlet water temperature is 60° F. The B.t.u. rating of the liquid heating device is determined using the water flow rate and temperature rise and is approximately 266,000 B.t.u.'s an hour. The heat energy going into the liquid heating device is based on the gas flow into the device and the heat value of the gas used. Using a gas having a heat value of on the order of 1080 B.t.u.'s a cubic foot and a gas flow rate of approximately 4.2 cubic feet a minute shows a heat energy rate into the system of about 272,000 B.t.u.'s an hour. Therefore, the liquid heating device performs at an efficiency of on the order of about 97 percent.

The above embodiments provide not only an efficient, economical and easily maintainable heating device but also one that is compact. Various embodiments other than those shown and described herein will become apparent to those skilled in the art from the foregoing description and accompanying drawings. Such other embodiments, and modifications thereof, are intended to fall within the scope of the appended claims.

What is claimed is:

1. A liquid heating device comprising a pair of generally vertically extending tubes, one generally disposed within the other, forming the side walls of an inner and outer heat exchange chamber, a source of liquid connected to a discharge arrangement within said outer heat exchange chamber for dispersing the liquid inside said outer heat exchange chamber and at least a portion of which is directed against the outer surface of the inner heat exchange chamber, said source of liquid also connecting with means at the upper end of the inner heat exchange chamber for causing liquid to flow downwardly along the inner surface of the inner heat exchange chamber side wall, a flame producing means extending downwardly into the upper portion of the inner heat exchange chamber for heating the liquid flowing inside said inner heat exchange chamber, passage means at the lower end of the side wall of the inner heat exchange chamber interconnecting the inner heat exchange chamber with the outer heat exchange chamber and vent means at the upper end of the outer heat exchange chamber for allowing heated gases generated within the inner heat exchange chamber to flow from the lower end of the inner heat exchange chamber into the outer heat exchange chamber and then upwardly in the outer heat exchange chamber through the dispersed liquid in said outer heat exchange chamber to said vent means and then out of the liquid heating device, a sump for heated liquid formed at the lowermost portion of the liquid heating device and being in communication with the lowermost portion of the inner heat exchange chamber and the outer heat exchange chamber, and outlet means for withdrawing heated liquid from said sump.

2. A liquid heating device in accordance with claim 1 where the liquid dispersing means comprises a plurality of spaced spray nozzles at least a portion of which are located at the upper end of the outer heat exchange chamber and are directed so as to disperse the liquid against the outer surface of the inner heat exchange chamber.

3. A liquid heating device in accordance with claim 2 where the liquid dispersing means includes a circular and a vertical header.

4. A liquid heating device in accordance with claim 2 where at least a portion of the spaced spray nozzles are directed against the upper portion of the outer surface of the inner heat exchange chamber.

5. A liquid heating device in accordance with claim 1 where the liquid dispersing means are directly interconnected with the means which provide downward flow of liquid along the inner heat exchange chamber side wall.

6. A liquid heating device in accordance with claim 1 where a plate forms the top of both the inner heat exchange chamber and the outer heat exchange chamber, said plate acting as a platform to which is attached said flame producing means, a control means and a gas regulating means.

7. A liquid heating device in accordance with claim 6 where said plate is releasably attached so as to provide an emergency pressure relieving means.

8. A liquid heating device in accordance with claim 1 where the liquid dispersing means comprises a plurality of spaced spray nozzles and includes a circular header which is located at the upper end of the outer heat exchange chamber adjacent the upper end of the inner heat exchange chamber, at least a portion of said nozzles positioned so as to direct liquid against a substantial portion of the outer heat exchange chamber.

9. A liquid heating device in accordance with claim 1 where the inner tube is supported by the outer tube.

10. A liquid heating device in accordance with claim 1 where the flame producing means comprises an air supply means connected to a gas burner, which provides a pressurized system during operation.

References Cited

UNITED STATES PATENTS

| | | | |
|---|---|---|---|
| 2,767,784 | 10/1956 | Dean | 126—350 XR |
| 2,921,004 | 1/1960 | Wood. | |
| 2,987,061 | 6/1961 | Huber | 126—350 |
| 3,090,376 | 5/1963 | Chambers | 126—350 |
| 3,128,758 | 4/1964 | Schwabe | 126—360 |

FREDERICK L. MATTESON, Jr., Primary Examiner

ROBERT A. DUA, Assistant Examiner